INVENTOR:
WERNER BACH,
BY  J. Wesley Haubner
ATTORNEY

United States Patent Office 3,465,272
Patented Sept. 2, 1969

3,465,272
INTERNAL BUS CONNECTION FOR HIGH-CURRENT RING - CONNECTED TRANSFORMERS AND THE LIKE
Werner Bach, Pittsfield, Mass., assignor to General Electric Company, a corporation of New York
Filed Dec. 1, 1967, Ser. No. 687,243
Int. Cl. H01f 33/02
U.S. Cl. 336—12      7 Claims

ABSTRACT OF THE DISCLOSURE

An improved internal arrangement of bus conductors for ring-connected high current power transformers. Each phase winding is formed of a plurality of coils in a cylindrical phase winding assembly connected in parallel circuit relation through axially parallel pairs of bus conductors at one side of the winding assembly. In a three-phase apparatus three pairs of bus conductors are formed as the parallel side legs of three open-ended conductor loops in coplanar relation, two loops being nested in side-by-side relation within the third loop.

My invention relates to electric induction apparatus such as power transformers and the like, and more particularly to internal coil connections for high-current multiphase power transformers having a plurality of coils connected in parallel circuit relation in each phase winding with the phase windings connected in delta or ring circuit relation.

In high current inductive apparatus, such as power transformers for supply of electric current to electric furnaces or rectifiers, it has been the usual practice to connect a plurality of coils in parallel in each phase winding through separate pairs of collector buses disposed alongside and coextensive with each phase winding assembly. To effect a delta connection of the several phase windings the pairs of buses are then interconnected at the top of the transformer by means of bolted or brazed jumpers forming a delta closure. Such an arrangement requires excessive amounts of copper in the collector buses, for each collector bus must extend for the full length of the associated winding assembly and thus has excessive cross section throughout except at its high current end. Also, the use of jumpers to interconnect the collector buses is bulky, expensive, and in practice confines interconnection to the top of a transformer assembly. It is not always desirable to thus increase the height of a transformer assembly or to locate line bushings at the top of the casing.

Accordingly it is a general object of my invention to provide an improved internal coil and winding connection for ring-connected electric induction apparatus of the high current type.

It is another object of my invention to provide ring-connected internal collector buses of integral design for multi-phase electric induction apparatus of the high current type.

A more particular object of my invention is to provide delta-connected internal collector buses adapted to be so positioned in respect to associated three-phase electric induction apparatus that size and weight of the bus work is minimized.

Still another object of my invention is to provide side-mounted internal collector buses for a three-phase electric induction apparatus of such configuration that delta closure of the buses is formed integrally therewith and side mounting of line terminals thus facilitated.

In carrying out my invention in one preferred embodiment, I employ a three-phase electric power transformer or the like having a plurality of phase winding assemblies in parallel spaced relation on a magnetizable core, each phase winding assembly comprising a plurality of separate coils axially spaced apart and connected electrically in parallel circuit relation. To so connect the coils of each phase winding assembly electrically in parallel and also connect the windings in ring-circuit relation, I provide a planar array of loop-shaped collector buses located entirely at one side of the winding assemblies. A three-phase set of delta-connected buses, for example, comprises three rectangular loop conductors all in coplanar relation, two being nested in side-by-side relation within a third large outer loop. The parallel side legs of the loops are thus in three pairs, the inner pair being one leg of each inner loop and the outer pairs each including an outer loop leg and one leg of an inner loop. These three pairs of parallel side legs are so positioned that each pair extends in axially parallel juxtaposition to one phase winding assembly. The coils of each phase winding assembly are connected electrically in parallel across the juxtaposed pair of loop conductor side legs. The parallel side legs of the loop conductors thus serve as collector buses and the bight portions effect integral delta connection of the multi-coil phase windings. Preferably, the three loops of a single three-phase set of buses are each open at one end and the bight portions of the inner loops aligned in parallel juxtaposition with the bight of the outer loop.

To reduce size of the axially extending collector portions of the buses and to facilitate side mounting of line terminals, I prefer to utilize several such three-loop bus arrays, each extending axially along only a portion, or section, of each winding assembly. For example, the bus assembly may comprise two such delta-connected bus arrays in back-to-back relation with the bight portions of the outer loop extending in flatwise engaging relation transversely across the winding assemblies midway between the axial ends thereof. Similarly, the winding assemblies may be divided transversely into more than two sections and a three-loop bus array positioned laterally adjacent each section. When four such coplanar arrays are provided, the loops of the two axially intermediate arrays are in face-to-face relation and thus form closed loops each having two bight portions, the outer closed loop being in engagement with the bight portions of the outer loop in both the axially remote bus array.

As the description proceeds, it will be evident that my invention is not limited to three-phase bus arrays connected in delta-circuit relation, but is equally applicable to ring connections of any number of phases, $n$, merely by utilizing a number $n-1$ internal bus loops in side-by-side relation within a single outer loop, the total number of loops being aways equal to the number of phases.

My invention will be more fully understood and its various objects and advantages further appreciated by referring now to the following specification taken in conjunction with the accompanying drawing in which.

Figure 1:
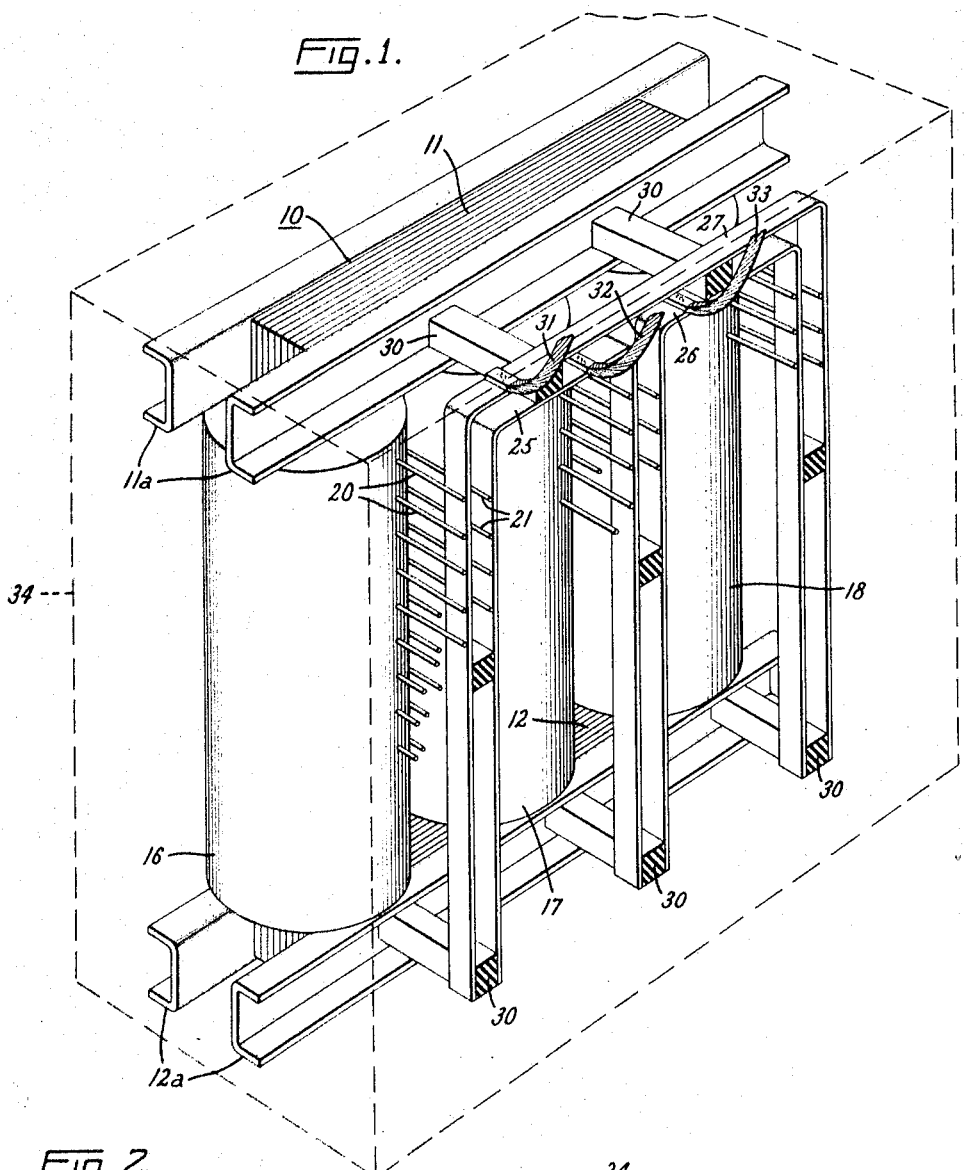
FIG. 1 is a perspective view of a three-phase electric induction apparatus having high-current windings interconnected in delta-circuit relation by a collector bus array embodying my invention.
Figure 2:
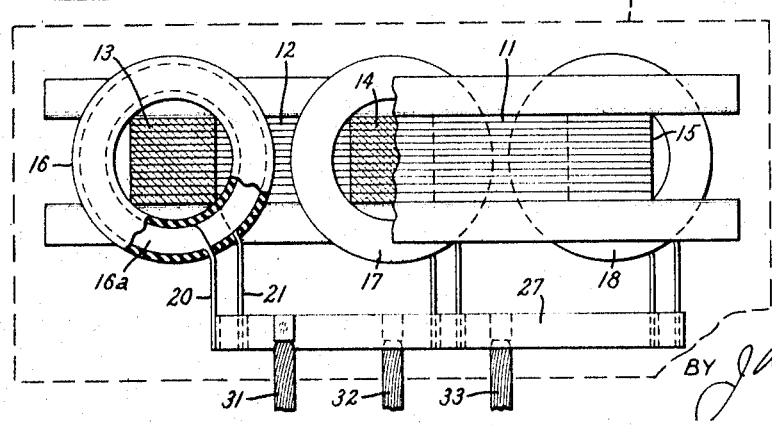
FIG. 2 is a plan view of the transformer shown at FIG. 1.
Figure 3:
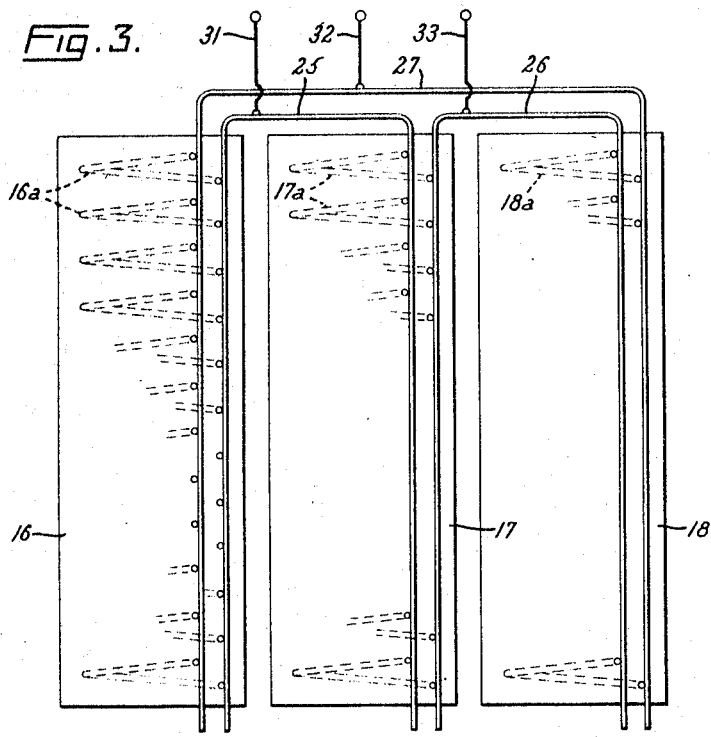
FIG. 3 is a side elevational view of the windings and bus array only in the apparatus shown at FIG. 1, showing the phase-winding coils in phantom display.

At FIGS. 1, 2 and 3, I have illustrated a three-phase electric induction apparatus, such as a power transformer having a magnetizable core 10 including upper and lower yoke portions 11 and 12, and three legs (FIG. 2) 13, 14 and 15 disposed in coplanar parallel spaced relation between the yokes. As is conventional, the upper and lower yokes 11 and 12 are firmly clamped and held in position by pairs of yoke clamps 11a and 12a, respectively, each yoke clamp being of channel-shaped cross section to provide adequate strength and rigidity. Other conventional structural members have been omitted in order to simplify the drawing and clarify the illustration of my invention.

Upon each core leg 13, 14 and 15, there is mounted a phase winding assembly comprising a plurality of separate helical coils disposed in axial spaced relation. These winding assemblies are indicated generally by the reference numerals 16, 17 and 18 associated, respectively, with the core legs 13, 14 and 15. Individual coils of each winding assembly are shown in phantom display at FIG. 3 and identified, respectively, as 16a, 17a and 18a. In order that the individuals coils of each phase winding assembly may be connected in parallel circuit relation, the opposite ends of each coil are brought out laterally from the winding as indicated at FIGS. 1 and 3. For example, the upper coil 16a of the winding assembly 16 has its end leads 20 and 21 brought out laterally. Similarly, the other individual coils 16a, 17a and 18a have the end leads of each coil brought out at the same side of the core as will be evident from the drawing.

It will, of course, be understood by those skilled in the art that in electric transformers (as distinguished, for example, from reactors), each core leg includes at least one additional winding (not shown) in inductive relation with the multi-coil winding to be described. For example, in the illustrated embodiment of the invention, it will be understood that in addition to the high-current winding illustrated, each core leg is to be provided also with a low current, high voltage winding in primary or secondary relation to the illustrated winding.

To form the plurality of separate coils in each winding assembly 16, 17, 18 into a single high-current phase winding, like ends of the coils are connected to collector buses thereby to connect all coils on each assembly in parallel circuit relation. In the embodiment of the invention illustrated at FIGS. 1, 2 and 3, all coils in each phase winding assembly are connected in parallel circuit relation between a single pair of collector buses which extend in parallel spaced relation along the full length of the winding assembly. In accordance with my invention, these parallel pairs of buses are formed integrally with delta interconnections therebetween, all disposed in coplanar array at one side of and parallel to the coplanar group of winding assemblies 16, 17, 18.

The delta-connected bus array shown at FIGS. 1, 2 and 3 comprises three U-shaped or open loops, each of substantially rectangular configuration and formed of a single flat bar or strap of electric conducting material. Referring more particularly to FIGS. 1 and 3, it will be observed that a pair of small inner conductor loops arranged in coplanar side-by-side relation with their bight portions in alignment are nested within or embraced by a larger outer loop 27 having its bight portion in parallel juxtaposition with bight portions of the inner loops. The side portions, or legs, of each conductor loop extend parallel to the axes of the winding assemblies 16, 17, 18 in three pairs, each pair being laterally adjacent one phase winding assembly and providing a pair of collector buses for the several coils of that winding. The bight portions of the conductor loops serve as integral delta interconnections between the phase collector buses. Specifically, the six side portions of the three coplanar conductor loops shown are arranged as central and outer pairs of collector buses, the pairs being positioned, respectively, laterally adjacent the central winding assembly 17 and the outer assemblies 16 and 18. The central pair of collector buses is formed by one leg of each of the inner conductor loops 25, 26. Each outer pair of parallel collector buses is formed by one leg of the outer conductor loop 27 and one leg of one of the inner conductor loops.

As best illustrated at FIGS. 1 and 3, each phase winding is formed by connecting in parallel circuit relation the separate current conducting coils in one of the winding assemblies 16, 17, 18. This is accomplished by connecting, as by welding, like ends of each coil to one adjacent collector bus and opposite ends of each coil to the other adjacent collector bus of the same pair. When thus connected into three high-current phase windings, the integral bight portions of the conductor loops will be observed to connect the phase windings in delta, or ring, circuit relation without additional bolted connections. Thus the entire three-loop coplanar bus array is readily mounted as shown at FIG. 1 at one side of the transformer without extending beyond the parallel upper and lower core yoke portions 11 and 12. As illustrated at FIG. 1, the bus array may, for example, be mounted directly on the yoke clamps 11a and 12a by mounting brackets 30. Line terminal connections may be made at any desired point on each bus loop. At FIGS. 1, 2 and 3, flexible line conductors 31, 32 and 33 are shown leading from the bight of each loop to an external terminal, represented only diagrammatically. Conventional line terminal bushings (not shown) may be mounted at the side or top of a suitable enclosing casing 34 (indicated by dotted lines at FIGS. 1 and 2).

It will now be evident to those skilled in the art that my loop-shaped collector buses may be utilized for ring connection of any number of phase windings greater than two. In any multiphase array a single outer loop embraces a group of inner loops in side-by-side relation, the number of inner loops beinng $n-1$ where $n$ represents the number of ring-connected phase windings.

Figure 4:
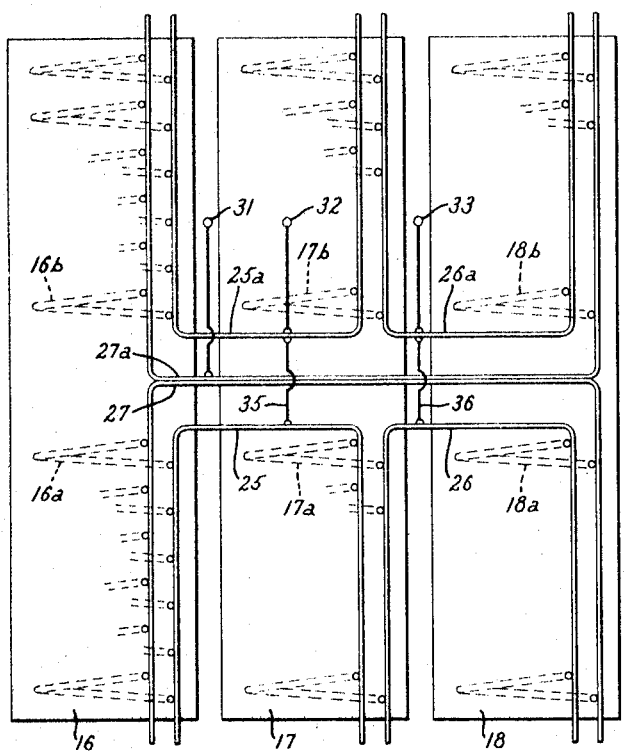
FIGS. 4 and 5 are side elevational views similar to that of FIG. 3 but illustrating several other bus arrangements embodying my invention.

At FIG. 4, I have illustrated in a partial side elevational view, similar to that of FIG. 3, another embodiment of my collector bus assembly in which two three-loop bus arrays, each similar to that described above, are disposed in coplanar back-to-back relation laterally adjacent transversely divided halves of the phase winding assemblies. At FIG. 4 the same reference numerals have been given to those parts corresponding to like parts at FIGS. 1, 2 and 3, the lower bus assembly being shown as comprising inner loop conductors 25 and 26 and an outer loop conductor 27 connected to phase winding coils 16a, 17a and 18a. In the embodiment shown at FIG. 4, however, each phase winding assembly is sectionalized axially to define two axially spaced groups of coils. The transversely aligned coil groups 16a, 17a and 18a and the laterally adjacent coplanar bus array extend axially along only the lower half of each winding assembly. A similar bus array comprising three open-loop bus conductors 25a, 26a and 27a is provided adjacent the upper halves of the phase winding assemblies and is connected to a set of coil groups 16b, 17b and 18b in the upper halves of the winding assemblies. In this embodiment, then, the bight portions of all the conductor loops extend transversely across the winding assemblies midway between their axial ends (i.e., in the region of the sectionalizing juncture). The set of aligned groups of coils in the lower sections of the phase winding assemblies are connected through the lower array of U-shaped bus conductors, and the upper set of transversely aligned coil groups are connected through the upper array of U-shaped buses.

In order to connect the coil group 16a at FIG. 4 in parallel circuit relation with the coil group 16b and to effect like parallel connection of corresponding coil groups in the other phase windings, the outer loop conductors 27 and 27a are disposed in back-to-back relation with their bight portions in parallel engaging relation, and the two inner loop conductors associated with the same phases are electrically connected together in axially aligned groups, as by jumpers 35 and 36. In this way axially aligned pairs of phase coil collector buses are connected in series circuit relation. As at FIGS. 1, 2 and 3, line terminal connections 31, 32 and 33 at FIG. 4 are made to the connected bight portions of the three conductor loops in each array. As illustrated schematically at FIG. 4, these line terminal connections may conveniently be made intermediate the upper and lower yokes of the transformer and thus brought out through a side wall of the transformer casing.

Figure 5:
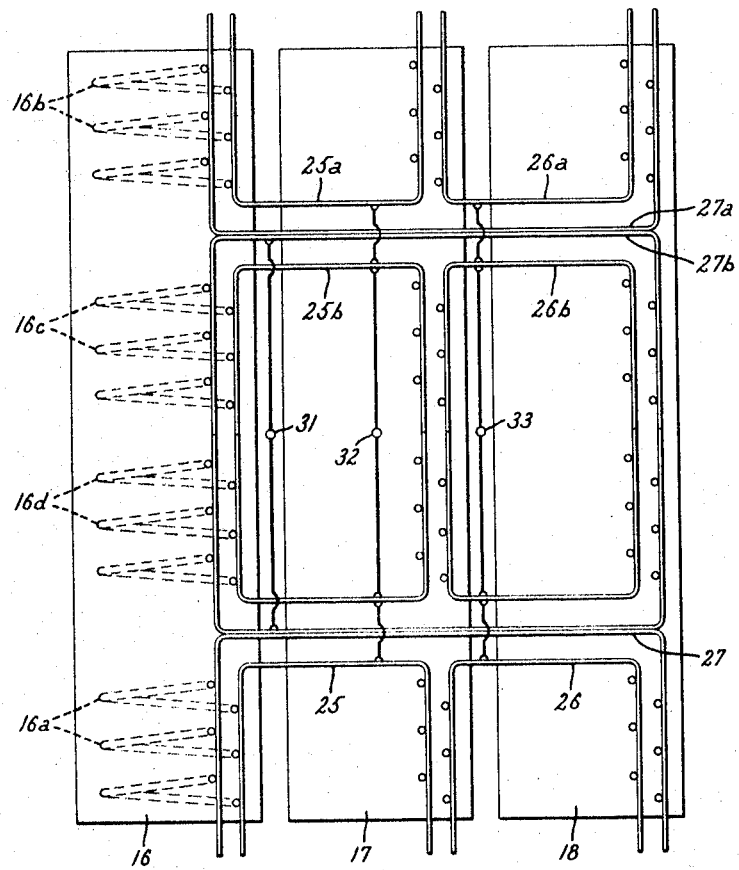

At FIG. 5, I have illustrated schematically still another embodiment of my invention in which the coils on each phase winding assembly are divided into four axially adjacent sections or groups, illustrated in the coil assembly 16 as groups 16a, 16b, 16c and 16d. The upper and lower coil groups at the axially remote ends or sections of each winding assembly are connected in parallel circuit relation through delta-connected open-loop bus arrays 25, 26, 27 and 25a, 26a and 27a similar to those shown at FIG. 4. Intermediate these axially remote open-loop bus arrays, however, FIG. 5 shows an additional delta-connected bus array comprising two closed inner loops 25b and 26b in side-by-side relation with a closed outer loop 27b. The phase coil groups 16c and 16d (and transversely aligned coil group of the other phases) are connected in parallel circuit relation through the closed conductor loops 25b, 26b and 27b. For ease of manufacture, the intermediate bus conductor array of three coplanar closed loops is preferably formed as a pair of open loop arrays connected together in face-to-face relation as indicated on FIG. 5 at the central interface. To connect all the coils of each phase winding assembly in parallel circuit relation, all three delta-connected bus arrays shown at FIG. 5 are disposed in coplanar relation with the outer loop bight portions of the axially remote arrays in flatwise engagement with the two opposite bight portions of the intermediate closed loop array and axially aligned groups of inner loop conductors are electrically connected together. Line terminals 31, 32 and 33 are shown as brought out laterally to a side wall by jumpers connected to the resulting three groups of loop conductors.

It will now be evident that my improved bus conductor assembly may be composed of any desired number of individual n-phase loop arrays, the number of arrays corresponding to the number of axially adjacent coil sections in each winding assembly. Axially intermediate arrays may be combined in pairs by closed-loop construction.

It will be understood by those skilled in the art that the ring-connected loop-shaped collector bus arrays of my invention may be formed of either open loop or closed loop conductors. If formed of open loop conductors, the bight portions of all loops need not necessarily be in juxtaposition as illustrated in the drawings. For example, at FIGS. 1, 2 and 3, the bight portions of the inner loops may be located at the open end of the outer loop, the disposition being selected in accordance with other desired electrical connections, such as the line terminal connections, typically mounted upon the transformer casing.

Thus while I have shown and described certain preferred embodiments of my invention by way of illustration, many modifications will occur to those skilled in the art, and I therefore wish to have it understood that I intend in the appended claims to cover all such modifications as fall within the true spirit and scope of my invention.

What I claim as new and desire to secure by Letters Patent of the United States is:

1. In a multiphase electric induction apparatus of the ring-connected high-current type having a plurality of phase winding assemblies disposed in coplanar parallel spaced relation, each said phase winding assembly comprising a plurality of separate coils in axial spaced relation, a ring-connected bus conductor assembly comprising at least one array of loop-shaped conductors equal in number to the number of phases, each said loop conductor having two parallel side portions and at least one bight portion therebetween, said loop conductors being disposed in substantially coplanar relation with all said side portions in parallel spaced relation and one said loop conductor embracing all others, proximate side portions of adjacent loop conductors extending as collector buses in axially parallel pairs each adjacent one said winding assembly, and means connecting at least a portion of the coils on each said winding assembly in parallel circuit relation across the adjacent pair of collector buses thereby to form a plurality of multiple-coil phase windings integrally connected in ring-circuit relation.

2. In a multiphase electric induction apparatus of the ring-connected high current type having a plurality of phase winding assemblies disposed in coplanar parallel spaced relation, each said phase winding assembly comprising a plurality of separate coils sectionalized axially into the same predetermined number of coil groups, a ring-connected bus conductor assembly comprising a plurality of arrays of loop-shaped bus conductors in coplanar relation, each said array being disposed laterally adjacent one transversely aligned set of phase coil groups and comprising a number of loop conductors equal to the number of phases, the loop conductors of each said array having side portions in parallel spaced relation with one outer loop embracing all others, proximate side portions of adjacent loop conductors in each array extending as phase collector buses in axially parallel pairs each adjacent one phase coil group of a transversely aligned set of coil groups, means connecting the coils of each said coil group in parallel circuit relation across the adjacent pair of collector buses, the outer loop conductors of all said bus arrays being disposed in electrically conducting engagement, and means electrically connecting the inner loop conductors into axially aligned groups, thereby to connect axially aligned pairs of said phase collector buses in series circuit relation whereby each said phase winding assembly constitutes a multi-coil phase winding and the phase windings are connected in ring-circuit relation.

3. An electric induction apparatus according to claim 1 having two outer phase winding assemblies and at least one intermediate phase winding assembly disposed in axially parallel coplanar relation and wherein said bus conductor array comprises an outer loop conductor and at least two smaller loop conductors nested within the outer loop in side-by-side coplanar relation, the parallel side portions of said outer loop conductor being laterally adjacent said outer winding assemblies and extending axially therealong and each inner loop conductor having parallel side portions extending axially along and laterally adjacent to a juxtaposed pair of said winding assemblies, the transverse bight portions of all said inner loop conductors being in proximate parallel spaced relation to the bight portion of said outer loop conductor.

4. An electric induction apparatus according to claim 2 wherein each said bus conductor array comprises a plurality of U-shaped conductors nested in side-by-side relation within an outer U-shaped conductor, the inner U-shaped conductors having bight portions in alignment and in proximate parallel spaced relation with the bight portion of the loop conductor.

5. An electric induction apparatus according to claim 4 wherein the axially endmost conductor arrays are arranged in back-to-back relation and an even number of intermediate bus conductor arrays are paired in face-to-face relation and connected to form closed conductor loops, the bight portions of adjacent outer conductor loops extending transversely of said phase winding assemblies in parallel engaging relation.

6. A three-phase electric induction apparatus according to claim 2 wherein each of said phase winding assembly is centrally divided into two axially spaced coil groups and each said bus conductor array comprises three U-shaped conductor loops, each said array comprising two inner loops nested in side-by-side relation within an outer loop with the bight portions of all three loops in proximate relation, said bus conductor arrays being disposed in back-to-back relation with the bight portions of the outer conductor loops in parallel engaging relation.

7. A three-phase electric induction apparatus according to claim 2 wherein each said phase winding assembly is sectionalized into an even number of coil groups greater than two and each said bus conductor array comprises three U-shaped conductor loops, each said array comprising two inner loop conductors nested in side-by-side relation within an outer loop conductor with the bight portions of all three loop conductors in proximate relation, the axially endmost bus conductor arrays being in back-to-back relation and intermediate conductor arrays being disposed in face-to-face pairs forming conductor loops, the outer conductor loops of adjacent arrays having their transverse bight portions in parallel engagement.

References Cited
UNITED STATES PATENTS

| | | | |
|---|---|---|---|
| 1,141,199 | 6/1915 | Moody | 336—12 XR |
| 1,242,649 | 10/1917 | Brand | 336—12 XR |
| 1,386,828 | 8/1921 | Winston | 336—12 |

LEWIS H. MYERS, Primary Examiner

T. J. KOZMA, Assistant Examiner

U.S. Cl. X.R.

336—184